(12) United States Patent  
He

(10) Patent No.: US 9,106,427 B2  
(45) Date of Patent: Aug. 11, 2015

(54) LOCAL AREA NETWORK

(76) Inventor: Ziqiang He, Danville, CA (US)

( * ) Notice: Subject to any disclaimer, the term of this patent is extended or adjusted under 35 U.S.C. 154(b) by 1700 days.

(21) Appl. No.: 11/681,191

(22) Filed: Mar. 2, 2007

(65) Prior Publication Data

US 2007/0147354 A1 Jun. 28, 2007

Related U.S. Application Data

(63) Continuation-in-part of application No. 11/466,463, filed on Aug. 23, 2006.

(60) Provisional application No. 60/711,784, filed on Aug. 26, 2005, provisional application No. 60/785,857, filed on Mar. 25, 2006, provisional application No. 60/791,989, filed on Apr. 14, 2006.

(51) Int. Cl.
*H04J 3/12* (2006.01)
*H04L 12/10* (2006.01)
*H04L 12/407* (2006.01)
*H04L 12/931* (2013.01)

(52) U.S. Cl.
CPC .............. *H04L 12/10* (2013.01); *H04L 12/407* (2013.01); *H04L 49/00* (2013.01)

(58) Field of Classification Search
USPC .......................... 370/236, 254, 503, 504, 528
See application file for complete search history.

(56) References Cited

U.S. PATENT DOCUMENTS

| | | | | |
|---|---|---|---|---|
| 4,924,463 A * | 5/1990 | Thomas et al. | ............... | 370/520 |
| 5,524,218 A * | 6/1996 | Byers et al. | ................... | 710/305 |
| 6,636,529 B1 * | 10/2003 | Goodman et al. | ............ | 370/469 |
| 6,738,935 B1 * | 5/2004 | Kimmitt | ........................ | 714/701 |
| 7,089,485 B2 * | 8/2006 | Azadet et al. | ................. | 714/798 |
| 7,218,648 B1 * | 5/2007 | Jackson | ......................... | 370/528 |
| 7,230,957 B2 * | 6/2007 | Kang et al. | .................... | 370/535 |
| 7,483,432 B2 * | 1/2009 | Nuss et al. | ................. | 370/395.3 |
| 7,570,591 B2 * | 8/2009 | Dove | ............................. | 370/236 |
| 7,606,157 B2 * | 10/2009 | Brown et al. | ................. | 370/235 |
| 2005/0030808 A1 * | 2/2005 | Brown et al. | ................. | 365/222 |
| 2005/0135421 A1 * | 6/2005 | Chang et al. | .................. | 370/474 |
| 2006/0029100 A1 * | 2/2006 | Dove | ............................ | 370/474 |

* cited by examiner

*Primary Examiner* — Phuc Tran

(57) ABSTRACT

A local area network having multiplexing means for establishing out-of-band channels along with corresponding Ethernet channels over shared transmission media of twisted pair cables. The out-of-band channels are configured for implementing a separate packet switching system for operating a dedicated network application such as IP telephony communications; power sourcing equipment (PSE) may be further provided for supplying inline power over the twisted pair cables; and means for network access control and device location tracking may be further implemented for the separate packet switching system.

16 Claims, 11 Drawing Sheets

LOCAL AREA NETWORK

CROSS-REFERENCE TO RELATED APPLICATIONS

This application is a continuation-in-part of U.S. patent application Ser. No. 11/466,463 filed on Aug. 23, 2006 entitled "Local Area Network", which claims priority from U.S. Provisional Patent Application Ser. No. 60/711,784 filed Aug. 26, 2005 entitled "Dual-Switch Based Local Area Network", and U.S. Provisional Patent Application Ser. No. 60/785,857 filed Mar. 25, 2006 entitled "Ethernet Port Combiner", and U.S. Provisional Patent Application Ser. No. 60/791,989 filed Apr. 14, 2006 entitled "Auxiliary Channel Over a 1000Base-T Ethernet Link". Each of these related applications are incorporated herein by reference.

FIELD OF THE INVENTION

This invention relates generally to communication networks. More particularly, this invention is related to a dual-switch based local area network (LAN) which can be implemented to support Internet Protocol (IP) telephony communications.

BACKGROUND OF THE INVENTION

In recent years, Voice over Internet Protocol (VoIP) technology, also known as Internet Protocol (IP) telephony, has been adopted for conducting telephony communications over an Ethernet local area network (LAN). Compared to operating two separate communications networks, e.g. an Ethernet LAN for computer data communications and a PBX system for telephony communications in an office environment, a converged system by applying an Ethernet LAN for both data and voice communications would be highly desirable because it introduces network efficiencies for cost savings as well as for more tightly integration of data and voice applications.

Typically, most of today's Ethernet LANs are implemented as single-switch based systems in which a single Ethernet switch is used for switching both data and voice packets. The single Ethernet switch may comprises two or more physically separated Ethernet switches that are interconnected in certain way to operate as a single Ethernet switch. Usually, such an Ethernet switch may have to be provided with Quality of Service (QoS) and Virtual LAN (VLAN) capabilities as defined in IEEE Standard 802.1p/Q in order to support IP telephony communications.

However, such a single-switch based LAN presents several technical and operational issues and limitations which will make it difficult to deploy an IP telephony system over an Ethernet LAN. These technical and operational issues are briefly summarized as follows.

1) System reliability issue. Running data and voice communications over a single-switch based LAN is like "putting two eggs into one basket". Once the LAN crashes or becomes paralyzed by malicious attacks of denial of services (DOS), both data and voice communications becomes unavailable at the same time.
2) Security issue. Although a VLAN can separate voice traffic from other non-voice traffic in a LAN for implementing a more secured IP telephony system, security is still a concern because the VLAN only logically separates voice traffic from other non-voice traffic at the data link layer of the Open System Interconnection reference model (OSI), a standard reference model for communications between end users in a network, and there are still chances that a VLAN setup maybe compromised and voice packets maybe intercepted and eavesdropped.
3) Networks upgrade issue. To upgrade an existing Ethernet LAN for IP telephony communications, the legacy Ethernet switches may have to be replaced with new Ethernet switches that are built with the QoS and VLAN capabilities. Routers and firewall deployed in the LAN may also have to be replaced as they may not be VoIP "friendly", which would block in-bound callings. Such a forklift network upgrade is not only costly but also is likely to be very disruptive to the operation of the network.
4) Network management and maintenance issue. Migrating a legacy Ethernet LAN to a new LAN for IP telephony communications also introduces extra amount of workloads and costs associated with setting up and managing the new network. The network setup and management become much more complicated and time consuming because a lot more items and parameters related to the network behaviors and performances have to be configured and monitored, most of times manually by well trained and experienced IT professionals. The complexities and the need of highly trained IT personnel for setting up and managing an Ethernet LAN for IP telephony communications introduce hidden costs to the ownership of the overall network.
5) Remote diagnosis and trouble-shooting issue for supporting hosted VoIP (or IP PBX) services. A hosted VoIP service is a centralized telephony service offered by a service provider which has an IP PBX system installed at the service provider's location (e.g. a central office) and provides VoIP based telephony functions to a customer location via high-speed internet connections and the customer's internal network. A single-switch based internal network would make it extremely difficult for the service provider to look into the customer's internal network for remotely monitoring and trouble-shooting any system or service related issues because the service provider generally does not have any control over the customer's internal network.
6) Emergence 911 calls issue. In a traditional PBX system, a telephone is connected to a PBX port/line that is assigned with a fixed telephone number. This unique 1-to-1 mapping between a telephone number and a phone line or PBX port is used to track the physical location of the telephone. However, in an IP telephony system, the phone number of an IP phone is not associated with the port of an Ethernet LAN switch to which the IP phone is connected. Instead the phone number is assigned based on the Media Access Control (MAC) address of the IP phone itself. A MAC address is a physical address for identifying a device connected to a network. In other words, an IP phone can be connected to a different port of the LAN switch but still has the same telephone number. Such mobility nature of IP phones makes it difficult in tacking the location of the IP phone for supporting emergency 911 calling in an IP telephony system.

Meanwhile, because of the benefits of the convergence of data and voice communications over an Ethernet LAN, there are demands to resolve the above-mentioned technical and operational problems and limitations.

SUMMARY OF THE INVENTION

Accordingly, one aspect of the present invention is to provide a dual-switch based local area network in which a first switch operating as a data switch receives and forwards data packets over normal Ethernet channels among data terminal devices such as computers and a second switch operating as a voice switch receives and forwards data packets over out-of-band channels among voice terminal devices such as IP phones, where each of the out-of-band channels and a corresponding Ethernet channel is established on a shared transmission medium of a twisted pair LAN cable.

Another aspect of the present invention is to further provide inline power over each of the shared LAN cables for supplying power remotely to a voice terminal device such as an IP phone.

Another aspect of the present invention is to further implement a network access control process for the voice switch by which the voice switch receives and forwards packets only from authorized voice terminal devices and uniquely associates each receiving port of the voice switch with the MAC address of a single authorized voice terminal device such as an IP phone.

In one embodiment of the present invention, the Ethernet channel is a 10/100Base-T Ethernet link operating over two twisted pairs of a LAN cable and the out-of-band channel is a 10/100Base-T Ethernet link operating over the other two twisted pairs of the same LAN cable. Furthermore, inline power from an internal power sourcing equipment (PSE) is provided by using two twisted pairs of the same LAN cable.

In another embodiment of the present invention, the Ethernet channel is a 10/100Base-T Ethernet link operating over two twisted pairs of a LAN cable and the out-of-band channel is a 10/100Base-T Ethernet link operating over the other two twisted pairs of the same LAN cable. Furthermore, a voltage polarity adjusting means is implemented to receive and adjust the voltage polarity of externally applied inline power and transmit the inline power at a fixed voltage polarity over two twisted pairs of the same LAN cable.

In another embodiment of the present invention, the Ethernet channel is a 1000Base-T compatible Gigabit Ethernet link operating over four twisted pairs of a LAN cable and the out-of-band channel is established by transferring out-of-band data during inter-frame periods of the Gigabit Ethernet link of the same LAN cable.

These and other aspects and features of the present invention will become readily apparent to those of ordinary skill in the art after having read the following detailed description of the embodiments of the present invention, which are illustrated in the various drawing figures.

DETAILED DESCRIPTION OF THE INVENTION

Figure 1:
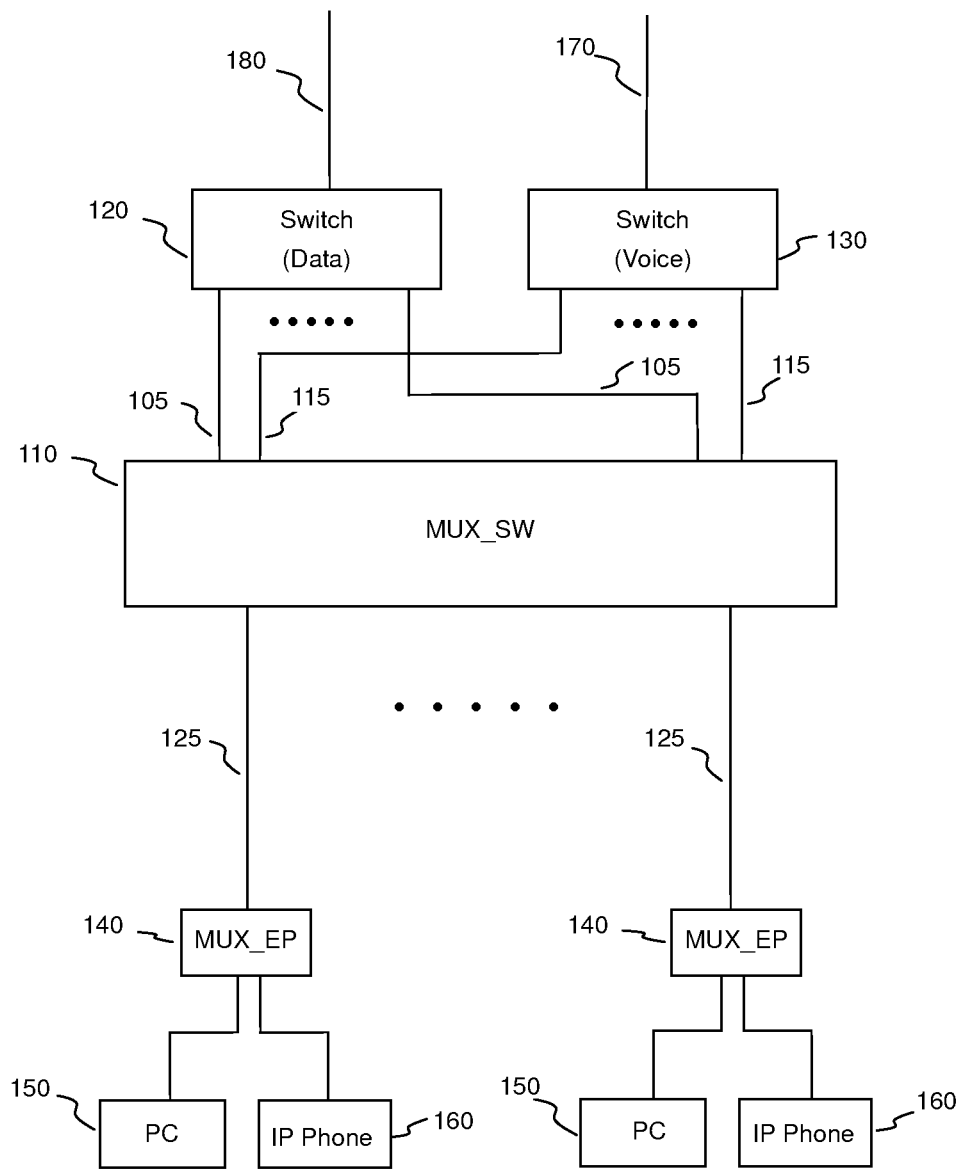
FIG. 1 is a system block diagram of a dual-switch based local area network of the present invention for supporting IP telephony communications on shared transmission media of twisted pair LAN cables.

For better understanding of the present invention, general developments and current applications of Ethernet LAN technology are further discussed.

Ethernet is a computer networking technology that was initially developed in 1970s as a local area network (LAN) solution for data communications among data terminal or host devices such as computers, printers, servers and etc within a local area such as an office building. Because of its simplicity and scalability, Ethernet has become the most widely adopted LAN technology and was standardized by IEEE (The Institute of Electrical and Electronics Engineers) as IEEE Standard 802.3, "Carrier sense multiple access with collision detection (CSMA/CD) access method and physical layer specifications".

According to IEEE Standard 802.3, a standard network cable of four twisted pairs of conductors such as a Category 5 cable or the like, referred to as a LAN cable in this disclosure, is used as a transmission medium to provide a communication link between two devices such as an Ethernet switch and a computer. In the following description of this disclosure, the four twisted pairs of a LAN cable are designated as pair 1-2, pair 3-6, pair 4-5 and pair 7-8, where the numerical numbers correspond to the pin numbers of a standard 8-pin RJ45 plug to which the four twisted pairs of the LAN cable are wired as a "straight-through" cable. In a "straight-through" cable, the four twisted pairs of the cable wires pins 1 through 8 of a RJ45 plug at one end of the cable to the corresponding pins 1 through 8 of a RJ45 plug at the other end of the cable. There is also a "cross-over" cable, in which pins 1 and 2 of a RJ45 plug at one end of the cable are wired to pins 3 and 6 of a RJ45 plug at the other end of the cable, and vice versa. The crossover cable may further have pins 4 and 5 of the RJ45 plug at one end of the cable wired to pins 7 and 8 of the RJ45 plug at the other end of the cable, and vice versa.

Of variants of Ethernet protocols, 10Base-T and 100Base-TX, referred to as 10/100Base-T in this disclosure, refers to transmission of Ethernet signals at 10 million bits per second (Mbps) and 100 Mbps respectively by using pair 1-2 and pair 3-6 of a LAN cable while pair 4-5 and pair 7-8 of the LAN cable are left unused. 1000Base-T refers to transmission of Ethernet signals at 1000 Mbps by using all of the four twisted pairs of a LAN cable.

An Ethernet Switch is a multi-port LAN interconnection device which operates at the data link layer, or Layer 2, of the OSI reference model. It allows Ethernet packets being communicated among multiple computers with much higher data throughput than shared bus topology.

"Power over Ethernet (PoE)" is a newly adopted technology that enables a unified supply of data and power through a single access point over a LAN cable. The PoE technology eliminates the need for a separate power cabling and installations of bulky AC adapters and AC outlets. As a matter of fact, PoE technology has been standardized as an IEEE standard, referred to as IEEE Standard 802.3af.

According to IEEE Standard 802.3af, a Power Sourcing Equipment (PSE) operating as either a Midspan or Endpoint apparatus provides DC or low frequency inline power over two pairs of a LAN cable to a PoE enabled remote device in one of two modes, referred to as "Alternative A" and "Alternative B", respectively. In "Alternative A", pair 1-2 and pair 3-6 of a LAN cable are used as two conducting paths for transmitting inline power as a common mode voltage. Because pair 1-2 and pair 3-6 of a LAN cable are also used for transmitting 10/100Base-T and 1000Base-T Ethernet signals in differential mode, "Alternative A" allows transmission of both power and data signals over the same two twisted pairs of a LAN cable. Therefore, "Alternative A" is applicable to both 10/100Base-T and 1000Base-T. In "Alternative B", pair 4-5 and pair 7-8 of a LAN cable are solely used as two conducting paths for transmitting inline power as a common mode voltage. Therefore, "Alternative B" is applicable only to 10/100Base-T. According to IEEE Standard 802.3af, a PoE enabled powered device (PD) such as a PoE enabled IP phone shall be able to receive inline power in either "Alternative A" or "Alternative B" mode.

Now referring to FIG. 1, it is a system block diagram of a dual-switch based local area network of the present invention for supporting IP telephony communications. A central multiplexer MUX_SW 110 and a corresponding remote multiplexer MUX_EP 140 at each remote terminal location are connected by a LAN cable 125, by which a normal Ethernet channel and an out-of-band channel are established over LAN cable 125. The out-of-band channel provides adequate bandwidth for transmission of at least one channel of digitized voice signal and preferably it provides enough bandwidth for transmission of a channel of compressed digitized video signal for video IP telephony communications. Typically, the data rate of an uncompressed digitized voice signal of telephony voice quality is 64 kilobits per second (Kbps), the actual data rate will be higher when the digitized voice signal is encapsulated as IP packets. Central multiplexer MUX_SW 110 further connects to a first switch, or data switch 120 via respective patch cables 105 and to a second switch, or voice switch 130 via respective patch cables 115. Each remote multiplexer MUX_EP 140 further connects via two patch cables to a computer 150 and an IP phone 160, respectively. Data switch 120 is dedicated for conducting computer data communications in which data switch 120 is configured to receive and forward data packets among computers 150 over the Ethernet channels and voice switch 130 is dedicated for conducting IP telephony communications in which voice switch 130 is configured to receive and forward data packets among IP phones 160 over the out-of-band channels. Preferably, PoE inline power is supplied to IP phone 160 over LAN cable 125, which is either generated by an internal power sourcing equipment PSE within central multiplexer MUX_SW 110 or is received externally over patch cable 115 from an external PSE unit. The external PSE unit may be integrated with voice switch 130 or it may be a standalone midspan PSE as defined in IEEE802.3af. Central multiplexer MUX_SW 110 may be implemented with different system configurations as will be further described below.

According to the present invention, data switch 120 and voice switch 130 are configured to operate in two different broadcast domains so that packets associated with IP telephony communications to and from voice switch 130 are separated or "isolated" at the data link layer from packets associated with computer data communications to and from data switch 120. As such, better QoS and security for conducting IP telephony communications is achieved. A broadcast domain refers to a subset of network nodes within which a broadcasting packet or a packet with an unknown destination MAC address issued from one of the network nodes is sent or "broadcasted" to all the other network nodes. A routing device operating at the network layer of OSI model is required to exchange packets between two broadcast domains.

Preferably, data switch 120 is a standard Ethernet switch. The primary use of data switch 120 is for receiving and forwarding packets associated with computers 150 or other data terminals or hosts. Typically, these computers are used for running "non-QoS critical" network applications, in which real time transmission of packets is not necessary. For example, email communication is a typical non-QoS critical network application. Data switch 120 can be a legacy unmanaged Layer 2 Ethernet switch, or it can be a more advanced managed Ethernet switch that supports VLAN and QoS, if desired.

Voice switch 130 is a packet-based switching device dedicated to receiving and forwarding packets associated with IP phones 160. Preferably, voice switch 130 is an unmanaged Layer-2 Ethernet switch, but it can be a more advanced managed Ethernet switch that supports VLAN and QoS, if desired. Voice switch 130 is not limited to an Ethernet switch and it can be a switching device of a different packet-based switching technology such as Asynchronous Transfer Mode (ATM).

Preferably, each of data switch 120 and voice switch 130 is provided with at least one uplink port for connecting with other network devices. As an example, the uplink port on data switch 120 connected to a patch cable 180 can be used for connecting to another Ethernet switch, a router or a server; the uplink port on voice switch 130 connected to a patch cable 170 can be used for connecting to another Ethernet switch, a call server for processing IP telephony calling or a public switching telephone network (PSTN) media gateway.

Although data switch 120, voice switch 130 and central multiplexer MUX_SW 110 are shown as separated devices in FIG. 1, they may be integrated together as a single network device.

Although data switch 120 and voice switch 130 are shown as a single device in FIG. 1, either of them can be a packet-switching system comprising multiple physically separated switches that are interconnected in certain way for achieving higher number of network ports.

Figure 2A:
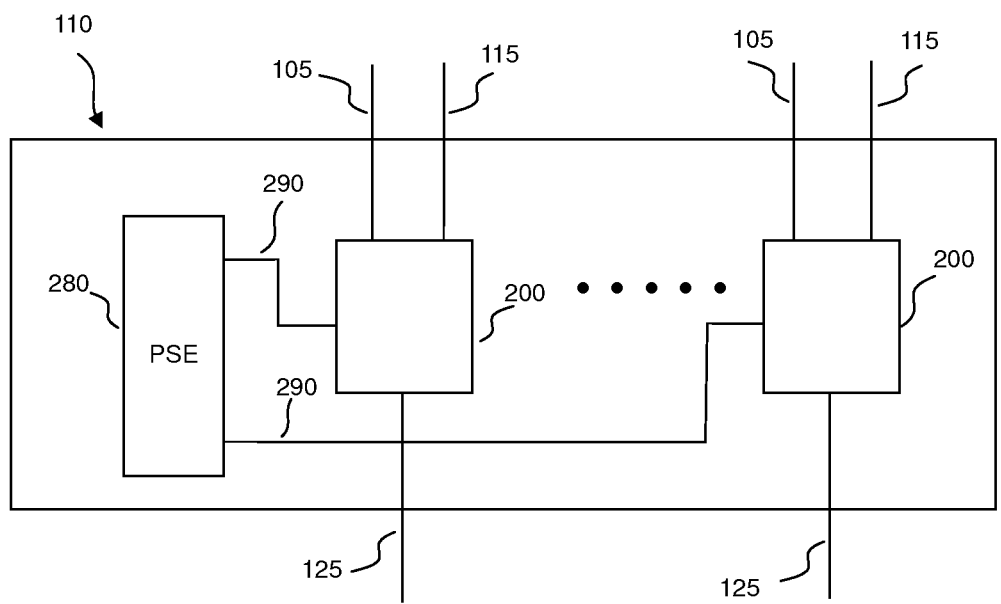
FIG. 2A is a block diagram of central multiplexer MUX_SW 110 in FIG. 1 with an internal power sourcing equipment PSE unit 280 according to an embodiment of the present invention.

Referring to FIG. 2A, it is a block diagram of central multiplexer MUX_SW 110 according to an embodiment of the present invention. Central multiplexer MUX_SW 110 as shown in FIG. 2A comprises a PSE 280 and at least one multiplexing module 200. Each multiplexing module 200 includes three I/O (input/output) ports. The first and second I/O ports are for connecting to data switch 120 and voice switch 130 via patch cable 105 and patch cable 115, respectively, and the third I/O port is for connecting by LAN cable 125 to a corresponding remote multiplexer MUX_EP 140.

Functionally, each multiplexing module 200, together with corresponding remote multiplexer MUX_EP 140, establishes an out-of-band channel by using twisted pair 4-5 and pair 7-8 of LAN cable 125 for delivering 10/100Base-T Ethernet signals carried by patch cable 115 and an Ethernet channel by using twisted pair 1-2 and pair 3-6 of LAN cable 125 for delivering 10/100Base-T signals carried by patch cable 105. Furthermore, inline power 290 provided by PSE 280 is applied between pair 4-5 and pair 7-8 of LAN cable 125 for supplying inline power remotely to IP phone 160.

Figure 2B:
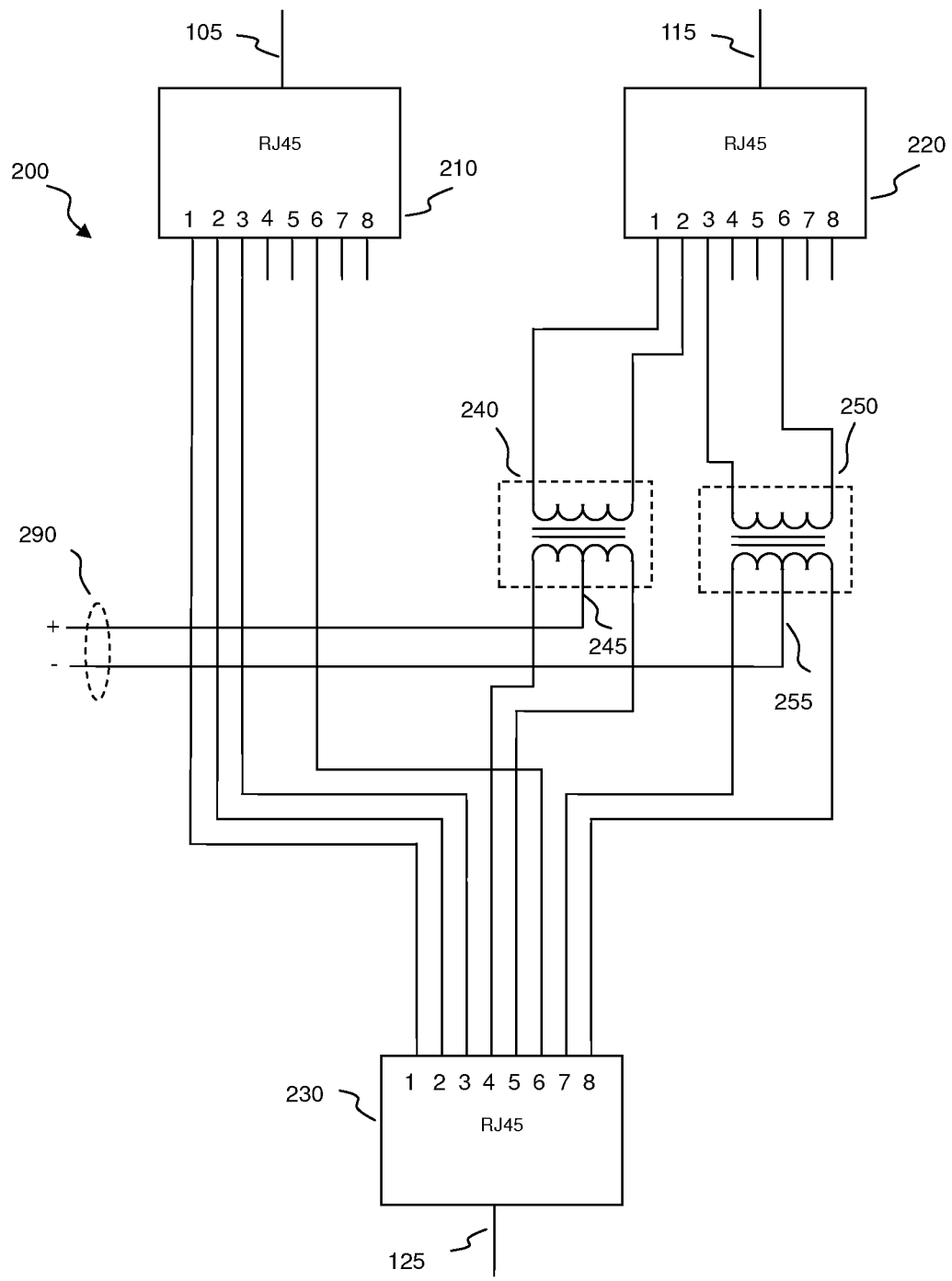
FIG. 2B is a schematic view of multiplexing module 200 in FIG. 2A.

Referring to FIG. 2B, it is a schematic view of multiplexing module 200 as shown in FIG. 2A. Multiplexing module 200 includes three RJ45 jacks 210, 220 and 230 for connecting to patch cable 105, patch cable 115 and LAN cable 125 respectively. As is shown in FIG. 2B, pins 1, 2, 3, and 6 of RJ45 jack 210 are directly wired to the corresponding pins 1, 2, 3 and 6 of RJ45 jack 230. As such, pair 1-2 and pair 3-6 of patch cable 105 and pair 1-2 and pair 3-6 of LAN cable 125 are electrically connected, respectively. Pins 4, 5, 7 and 8 of RJ45 jack 210 are left open or they may be terminated by a resistor-capacitor network of "Bob Smith Termination" that is traditionally implemented for such purpose. Similarly, pins 4, 5, 7 and 8 of RJ45 jack 220 are left open or they may be terminated by another resistor-capacitor network of "Bob Smith Termination". Pins 1 and 2 of RJ45 jack 220 are wired to the first winding of a first isolation transformer 240, and pins 4 and 5 of RJ45 jack 230 are wired to the second winding of isolation transformer 240, through which pins 4 and 5 of RJ45 jack 230 are DC-connected. In a similar way, pins 3 and 6 of RJ45 jack 220 are wired to the first winding of a second isolation transformer 250, and pins 7 and 8 of RJ45 jack 230 are wired to the second winding of isolation transformer 250, through which pins 7 and 8 of RJ45 jack 230 are DC-connected. In such a way, the Ethernet signals carried by pair 1-2 and pair 3-6 of patch cable 115 are AC coupled to pair 4-5 and pair 7-8 of LAN cable 125, respectively. The "+" and "−" output ends of inline power output 290 from PSE 280 are wired to the center tap 245 of first isolation transformer 240 and center tap 255 of second isolation transformer 250 respectively by which the inline power is applied between pin 4 (pin 5) and pin 7 (pin 8) of RJ45 jack 230. As such, pair 4-5 and pair 7-8 of LAN cable 125 carry both the Ethernet signals of patch cable 115 and the inline power 290 provided by PSE 280.

Figure 3A:
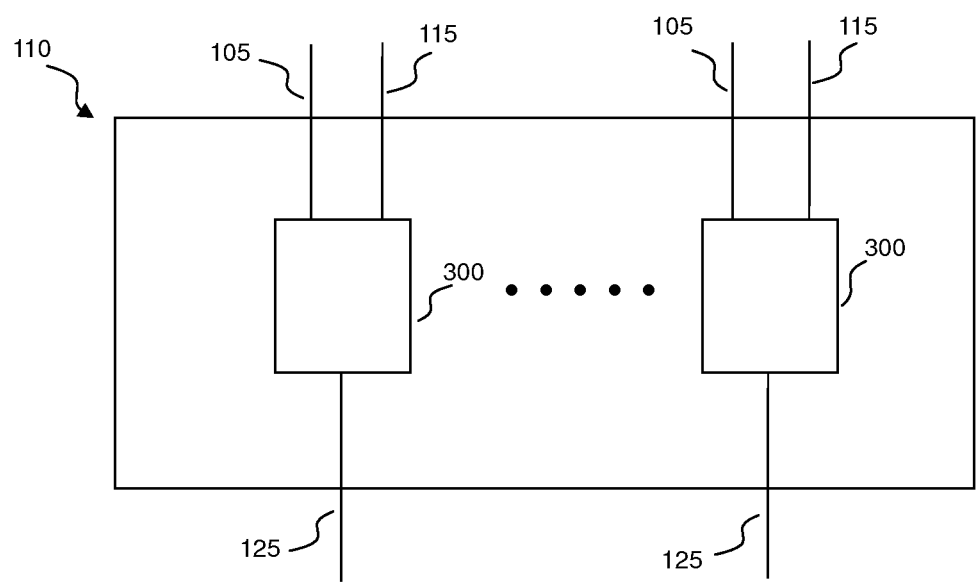
FIG. 3A is a block diagram of central multiplexer MUX_SW 110 in FIG. 1 without an internal PSE unit according to an embodiment of the present invention.

Referring to FIG. 3A, it is a block diagram of central multiplexer MUX_SW 110 as shown in FIG. 1 according to another embodiment of the present invention, in which inline power is applied externally over patch cable 115. MUX_SW 110 as shown in FIG. 3A includes at least one multiplexing module 300. Each multiplexing module 300 combines the two Ethernet signals carried by patch cables 105 and 115 respectively and delivers them over the four twisted pairs of LAN cable 25 in a similar way to what multiplexing module 200 in FIG. 2B does. On the other hand, multiplexing module 300 receives the inline power carried by patch cable 115, and applies the received inline power onto two twisted pairs of LAN cable 125 by a coupling and voltage polarity adjusting circuitry, which is described in more details below. The inline power carried by patch cable 115 is generated by an external PSE operating either as a mid-span PSE that is connected in between voice switch 130 and MUX_SW 110 or as an endpoint PSE that is integrated within voice switch 130.

Figure 3B:
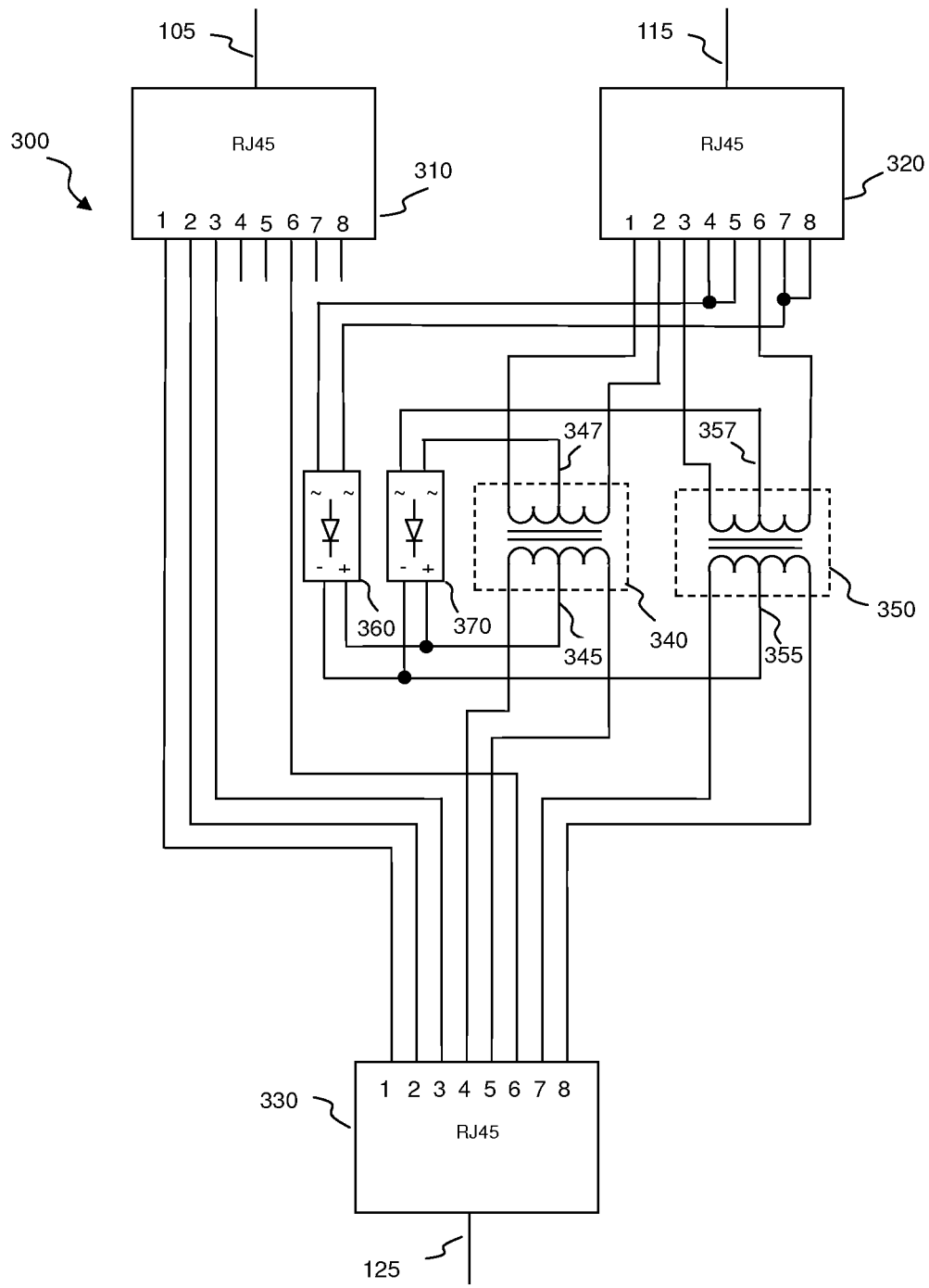
FIG. 3B is a schematic view of multiplexing module 300 in FIG. 3A.

Referring to FIG. 3B, it is a schematic view of multiplexing module 300 as shown in FIG. 3A. Multiplexing module 300 includes three RJ45 jacks 310, 320 and 330 for connecting to patch cable 105, patch cable 115 and LAN cable 125, respectively. Pins 1, 2, 3, and 6 of RJ45 jack 310 are wired directly to the corresponding pins 1, 2, 3 and 6 of RJ45 jack 330. As such, pair 1-2 and pair 3-6 of patch cable 105 and pair 1-2 and pair 3-6 of LAN cable 125 are electrically connected. Pins 4, 5, 7 and 8 of RJ45 jack 310 are left open or they may be terminated by a resistor-capacitor network of "Bob Smith Termination". Pins 1 and 2 of RJ45 jack 320 are wired to the first winding of a first isolation transformer 340, through which pins 1 and 2 of RJ45 jack 320 are DC-connected, and pins 4 and 5 of RJ45 jack 330 are wired to the second winding of isolation transformer 340, through which pins 4 and 5 of RJ45 jack 330 are DC-connected; pins 3 and 6 of RJ45 jack 320 are wired to the first winding of a second isolation transformer 350, through which pins 3 and 6 of RJ45 jack 320 are DC-connected; and pins 7 and 8 of RJ45 jack 330 are wired to the second winding of isolation transformer 350, through which pins 7 and 8 of RJ45 jack 330 are DC-connected. In such a way, the Ethernet signals carried by pair 1-2 and pair 3-6 of patch cable 115 are AC coupled via the two isolation transformers to pair 4-5 and pair 7-8 of LAN cable 125, respectively.

On the other hand, a first voltage polarity adjusting circuit comprising a diode bridge rectifier 360 is used to receive inline power applied between pin 4 (pin 5) and pin 7 (pin 8) of RJ45 jack 320, where pin 4 and pin 5 of RJ45 jack 320 are directly connected and pin 7 and pin 8 of RJ45 jack 320 are directly connected. The two input ends of diode bridge rectifier 360 are connected to pin 4 (pin 5) and pin 7 (pin 8), respectively and the "+" and "−" output ends of diode bridge rectifier 360 are connected to center tap 345 of first isolation transformer 340 and center tap 355 of second isolation transformer 350, respectively. Similarly, a second diode bridge rectifier 370 is implemented with its two input ends connected to center tap 347 of first isolation transformer 340 and center tap 357 of second isolation transformer 350, respectively to receive inline power carried between pair 1-2 and pair 3-6 of patch cable 115 via the two associated windings of transformers 340 and 350, respectively. The "+" and "−" output ends of diode bridge rectifier 370 are connected to the corresponding "+" and "−" output ends of diode bridge rectifier 360, which are then are further connected to center tap 345 of first isolation transformer 340 and center tap 355 of second isolation transformer 350. As such, these two voltage polarity adjusting circuits ensure that inline power applied externally in either "Alternative A" or "Alternative B" mode via patch cable 115 is applied between pair 4-5 and pair 7-8 of LAN cable 125 and is transmitted at a fixed voltage polarity between pair 4-5 and pair 7-8 of LAN cable 125, no matter if patch cable 115 is a "straight-through" cable or a "cross-over" cable.

Even though RJ45 jacks are used in describing the embodiments of the present invention as illustrated in FIG. 2A, FIG. 2B, FIG. 3A and FIG. 3B, other types of connectors may also be used when appropriate. For example, an 8-contact Insulation Displacement Contact (IDC) connector can be used to replace RJ45 jack 230 in FIG. 2B and RJ45 jack 330 in FIG. 3B when MUX_SW 110 is implemented as a patch panel.

Figure 4:
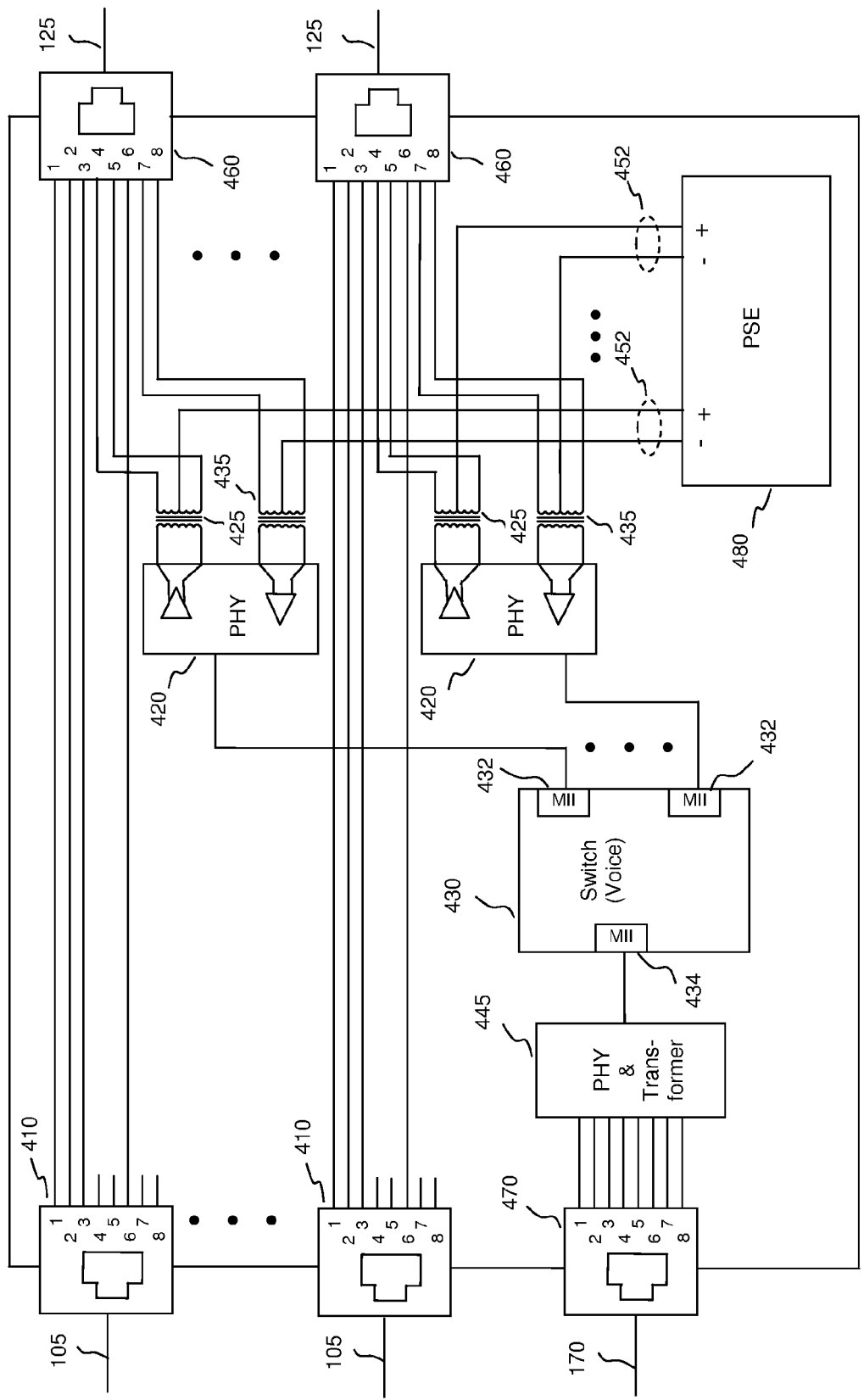
FIG. 4 is a schematic view of a networking apparatus of the present invention, which is an integration of an Ethernet switch functioning as voice switch 130 into central multiplexer MUX_SW 100 in FIG. 2A for operating advantageously as a single device.

Referring to FIG. 4, it is a schematic view of a networking apparatus of the present invention, which is an integration of an Ethernet switch functioning as voice switch 130 into central multiplexer MUX_SW 100 in FIG. 2A for operating advantageously as a single device.

As shown in FIG. 4, each RJ-45 jack 410 is for connecting to an I/O port on an external Ethernet switch functioning as data switch 120 over patch cable 105, and each RJ-45 jack 460 is for connecting to a corresponding remote multiplexer MUX_EP 140 over LAN cable 125. Pins 1, 2, 3 and 6 of RJ45 jack 410 and the corresponding pins of RJ45 jack 460 are wired directly. As such, pair 1-2 and pair 3-6 of patch cable 105 and pair 1-2 and pair 3-6 of the corresponding LAN cable 125 are connected. Ethernet switching unit 430 is provided with multiple I/O ports 432, each being a Media Independent Interface (MII), which is a standard interface between a data link layer device and a physical layer device as defined in the IEEE Standard 802.3. Each MII port 432 of Ethernet switching unit 430 connects with an Ethernet physical layer device (PHY) 420 which has a transmit port and a receive port. The two output ends of the transmit port of PHY 420 are connected with the two ends of the PHY-side winding of a first isolation transformer 425 and the two ends of the cable-side winding of isolation transformer 425 are connected to pins 4 and 5 of RJ45 jack 460, respectively. As such, the transmit output of PHY device 420 is differentially AC-coupled onto pair 4-5 of LAN cable 125. On the other hand, the two input ends of the receive port of PHY device 420 are connected with the two ends of the PHY-side winding of a second isolation transformer 435 and the two ends of the cable-side winding of isolation transformer 435 are connected to pins 7 and 8 of RJ45 jack 460, respectively. As such, the receive input of PHY device 420 is differentially AC-coupled with pair 7-8 of LAN cable 125. Furthermore, the two output ends of inline power port 452 from an internal PSE 480 are wired to the center tap of transformer 435 and the center tap of transformer 425 respectively as shown in FIG. 4 so that inline power is applied between pair 4-5 and pair 7-8 as a common mode voltage. As such, pair 4-5 and pair 7-8 of LAN cable 125 carry both transmit and receive Ethernet signals of PHY device 420 as well as inline power from PSE 480.

Ethernet switching unit 430 may be provided with at least one MII port 434 which is interfaced with a PHY device 445 that is further connected with RJ45 jack 470 via an isolation transformer (represented as part of the block 445) to form an uplink I/O port. RJ45 jack 470 is used for connecting with uplink cable 170. MII Port 434 may be implemented as a Gigabit Media Independent Interface (GMII) port for operating the uplink I/O port in one of the Gigabit Ethernet modes such as 1000Base-T.

Although RJ45 jacks are used in describing the embodiment of the present invention as illustrated in FIG. 4, other types of connectors may also be used when appropriate. For example, an 8-contact Insulation Displacement Contact (IDC) connector can be used to replace RJ45 jack 460 when the apparatus shown in FIG. 4 is implemented as an active patch panel.

As can be appreciated by a person skilled in the art, the networking apparatus as shown in FIG. 4 is equivalent to a midspan PSE with an integrated Ethernet switch operating as voice switch 130 which transfers packets over pair 4-5 and pair 7-8 of each of LAN cables 125.

Figure 5:
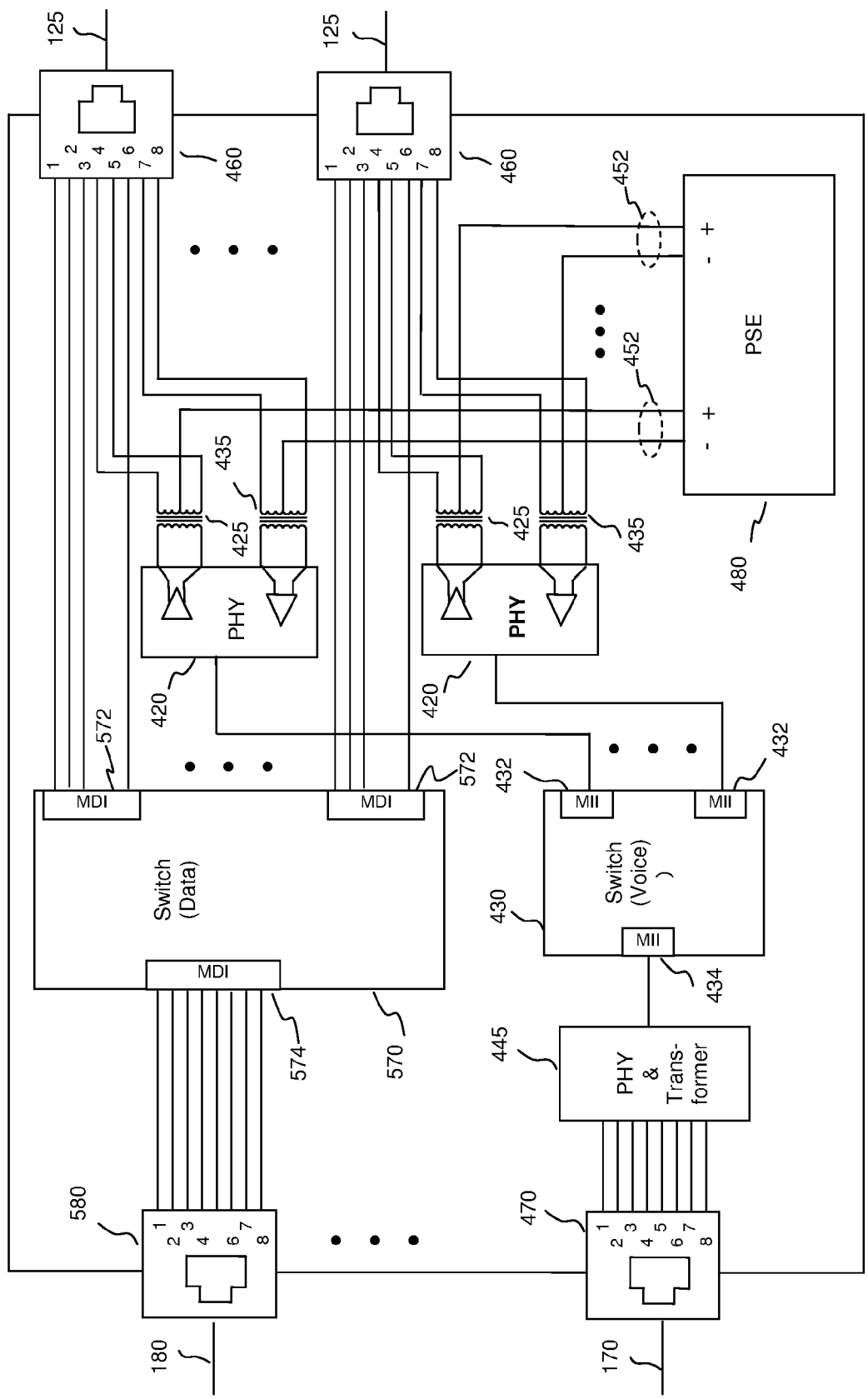
FIG. 5 is a schematic view of another networking apparatus of the present invention, which is a further integration of an Ethernet switching unit 570 functioning as data switch 120 as shown in FIG. 1 into the networking apparatus as shown in FIG. 4 for operating advantageously as a single device.

Referring to FIG. 5, it is a schematic view of another networking apparatus of the present invention, which represents a further integration of an Ethernet switching unit 570 functioning as data switch 120 as shown in FIG. 1 into the apparatus as shown in FIG. 4 for operating advantageously as a single device.

As shown in FIG. 5, Ethernet switching unit 570 is provided with multiple ports 572 and optionally at least one uplink port 574, each being a Media Dependant Interface (MDI) as defined in the IEEE Standard 802.3. A MDI port operating in the 10/100Base-T Ethernet mode is a four-pin interface consisting of two differential transmit pins and two differential receive pins for connecting with two twisted pairs of LAN cable 125 directly. The MDI ports are illustrated in FIG. 5 just for the benefit of simplifying the drawing of FIG. 5 by not showing the PHY devices and their associated isolation transformers.

As is shown in FIG. 5, pins 1, 2, 3 and 6 of RJ45 jack 460 are wired with corresponding pins of MDI port 572 of Ethernet switching unit 570. As such, computer 150 communicates with Ethernet switching unit 570 over pair 1-2 and pair 3-6 of corresponding LAN cable 125. Ethernet switching unit 570 may be provided with at least one uplink port 574 comprising RJ45 jack 580 for connecting with uplink cable 180. Port 574 may be implemented as a Gigabit Ethernet port.

In the embodiments of the present invention as illustrated in FIG. 2 through FIG. 5, a 3-port remote multiplexer MUX_EP 140 is used at each remote location. Remote multiplexer MUX_EP 140 is provided with one I/O port for connecting to central multiplexer MUX_SW 110 over associated LAN cable 125 and another two I/O ports for connecting via two patch cables to computer 150 and the IP phone 160, respectively. Such a multiplexing apparatus is commercially available, which is often referred to as RJ45 splitter or Ethernet cable splitter. Preferably, remote multiplexer MUX_EP 140 can be integrated into IP phone 160.

Figure 6:
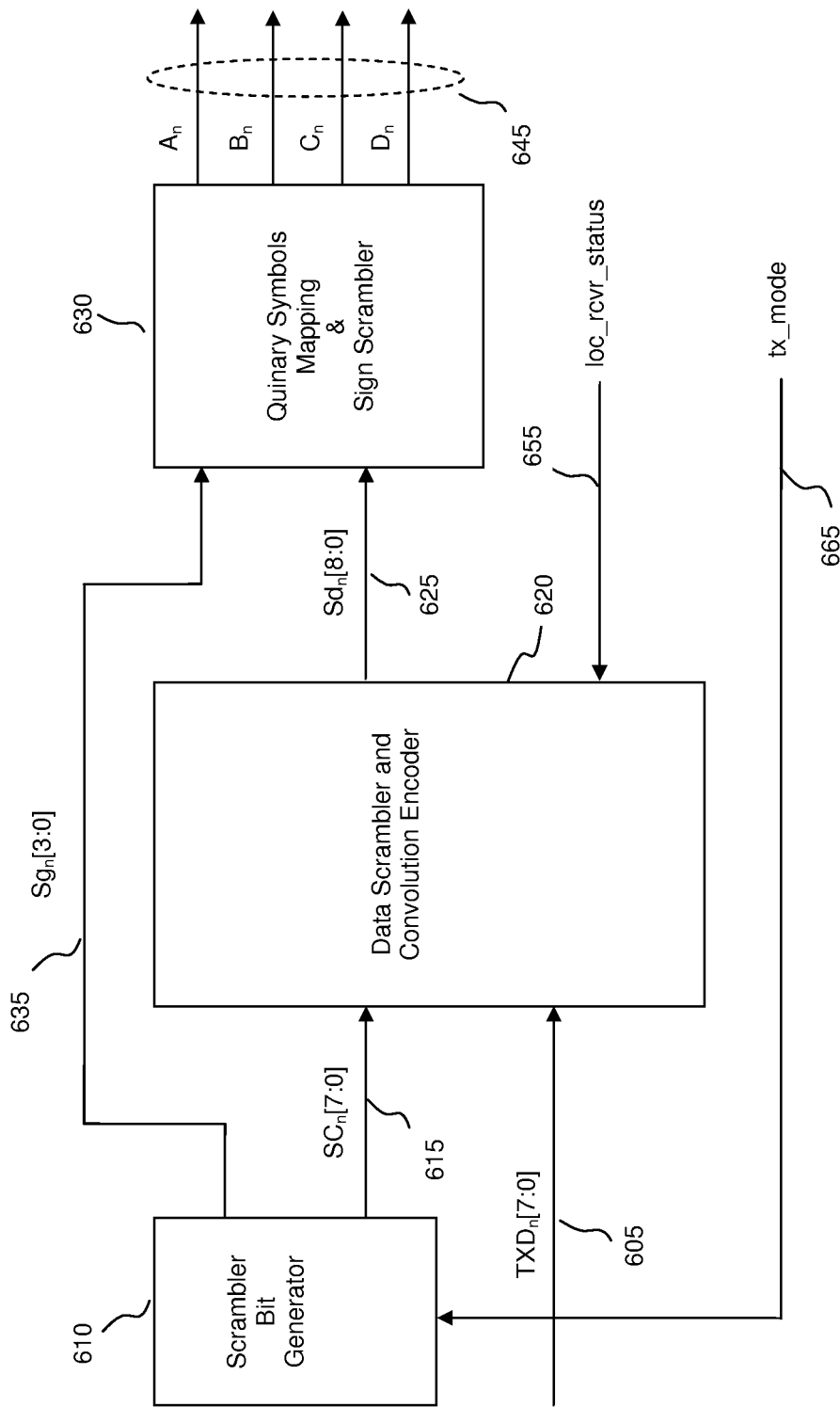
FIG. 6 is a simplified block diagram of the 1000Base-T Physical Coding Sublayer (PCS) transmitter according to IEEE Standard 802.3.
Figure 7:
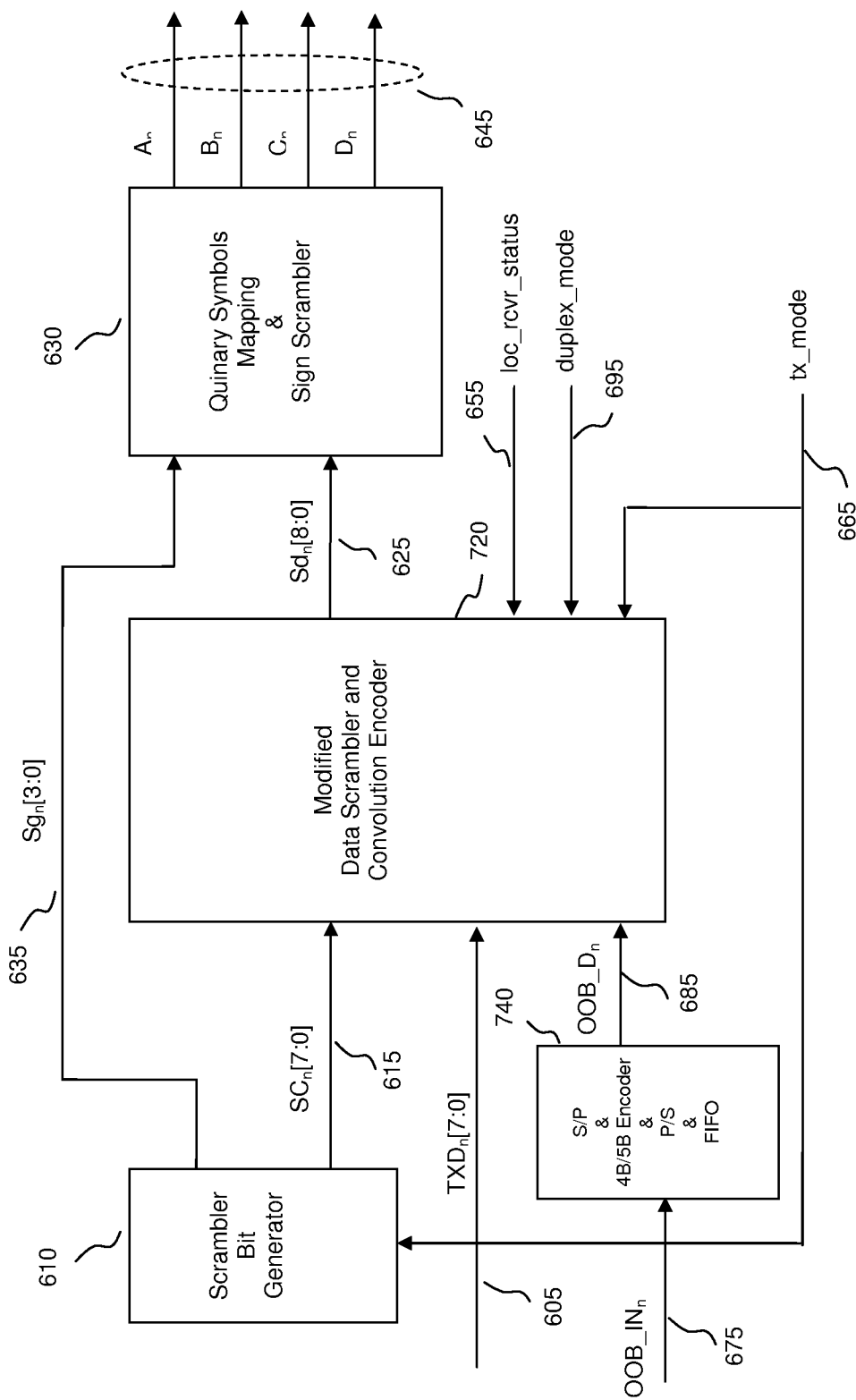
FIG. 7 is a block diagram of a modified 1000Base-T PCS transmitter of the present invention for transferring out-of-band data via the scrambled bit $Sd_n[2]$.
Figure 8:
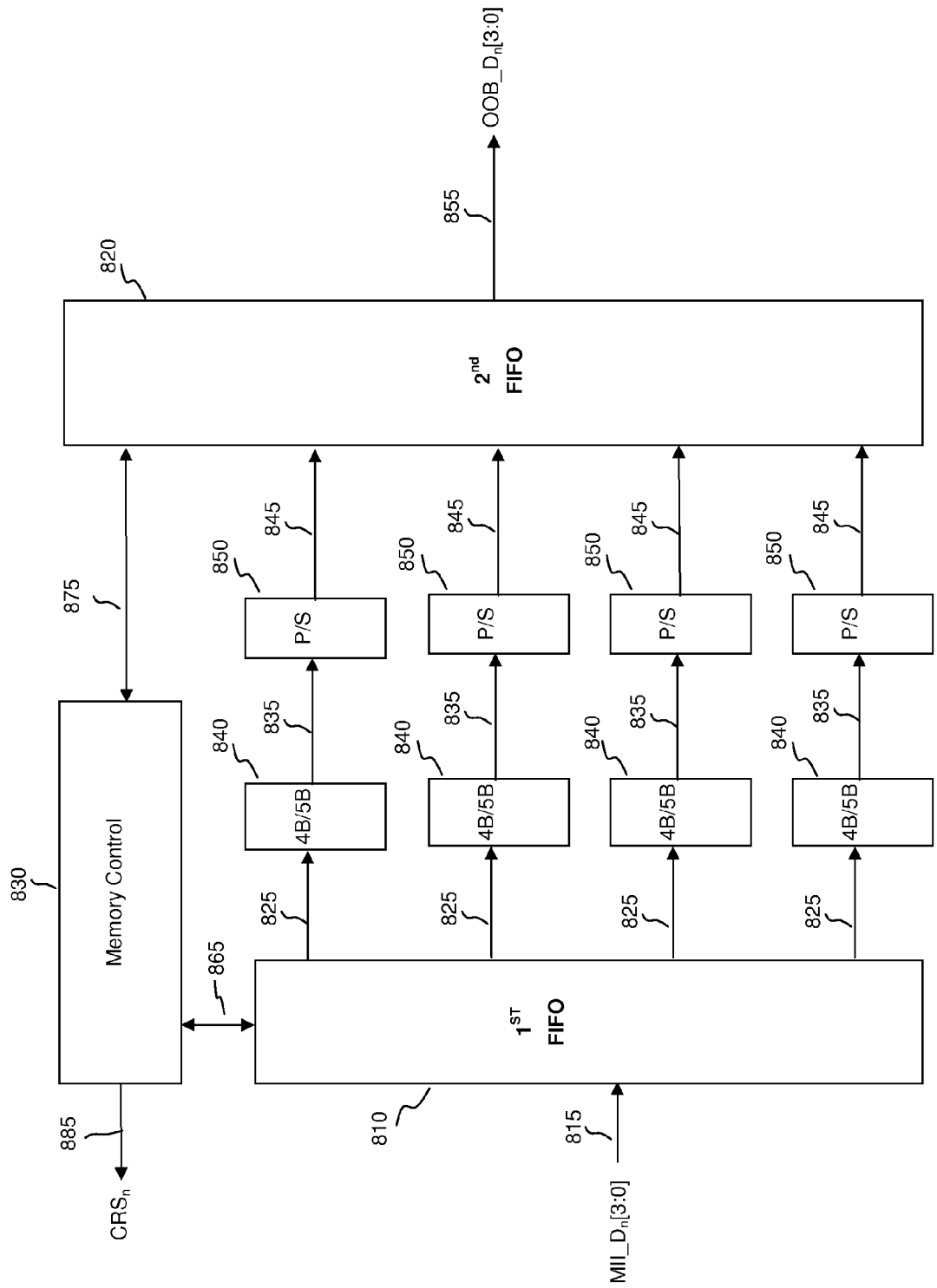
FIG. 8 is a block diagram of an embodiment of the present invention for transferring out-of-band data by using all of the four scrambled bits $Sd_n[3:0]$ where the out-of-band data is 4-bit data that is operated according to the Media Independent Interface signaling protocol.

FIG. 6, FIG. 7 and FIG. 8 are presented below to describe methods of the present invention for transferring out-of-band data along with a Gigabit Ethernet channel operating as a 1000Base-T Ethernet link using all the four twisted pairs of LAN cable 125, which can be used to implement central multiplexer MUX_SW 110 as well as remote multiplexer MUX_EP 140 for establishing an out-of-band channel along with the Ethernet channel operating compatibly as a 1000Base-T link over LAN cable 125.

Referring to FIG. 6, it is a simplified block diagram of a transmitter of 1000Base-T physical coding sublayer (PCS) as specified in IEEE Standard 802.3. As shown in FIG. 6, each 8-bit Gigabit Media Independent Interface (GMII) transmit data, $TXD_n[7:0]$ 605, is scrambled by a Data Scrambler and Convolution Encoder 620 with an 8-bit random data, $SC_n[7:0]$ 615, which is generated by a Scrambler Bit Generator 610. The output from Data Scrambler and Convolution Encoder 620 is a 9-bit data, represented as $Sd_n[8:0]$ 625. Each 9-bit data $Sd_n[8:0]$ 625 is then mapped to a quartet of quinary symbols $(TA_n, TB_n, TC_n, TD_n)$ (not shown) inside a Quinary Symbols Mapping & Sign Scrambler 630 according to Table 40-1 and Table 40-2 of IEEE Standard 802.3. The signs of the symbols $(TA_n, TB_n, TC_n, TD_n)$ are further randomized by a 4-bit random data $Sg_n[3:0]$ 635 to remove the DC bias from the symbols $(TA_n, TB_n, TC_n, TD_n)$, which is then output as a quartet of quinary symbols, represented as $(A_n, B_n, C_n, D_n)$ 645.

According to IEEE Standard 802.3, signal "loc_rcvr_status" 655 is transmitted to a receiver, which has two values including "OK" and "NOT OK" to indicate the receive status of the local physical layer device. At the receiver, this signal is received as signal "rem_rcvr_status" (not shown), which also has two values including "OK" and "NOT_OK" to indicate the receive status of the corresponding remote physical layer device.

According to IEEE Standard 802.3, signal "tx_mode" 665 is generated by the Physical Medium Attachment (PMA) sublayer and is used to generate certain bits of 8-bit random data $SC_n[7:0]$ 615 by Scrambler Bit Generator 610. Signal "tx_mode" 665 has three values including "SEND_N", "SEDN_I" and "SEND_Z".

When tx_mode=SEND_N, the PCS transmitter operates in normal mode in which it transmits data, control or idle signals, each being a quartet of quinary symbols $(A_n, B_n, C_n, D_n)$ 645; when tx_mode=SEND_I, the PCS transmitter operates in training mode in which it is directed to transmit only idle signals, which enable the receiver at the other end to train until it is ready to operate in normal mode.

Among 9 bits of the scrambled data $Sd_n[8:0]$, the four least significant bits $Sd_n[3:0]$ are generated by using the following equations (1) through (4) according to IEEE Standard 802.3:

$$Sd_n[3] = \begin{cases} Sc_n[3] \wedge TXD_n[3] & \text{if } (tx\_enable_{n-2} = 1) \\ Sc_n[3] & \text{else} \end{cases} \quad (1)$$

$$Sd_n[2] = \begin{cases} Sc_n[2] \wedge TXD_n[2] & \text{if } (tx\_enable_{n-2} = 1) \\ Sc_n[2] \wedge 1 & \text{else if } (loc\_rcvr\_status = OK) \\ Sc_n[2] & \text{else} \end{cases} \quad (2)$$

$$Sd_n[1] = \begin{cases} Sc_n[1] \wedge TXD_n[1] & \text{if } (tx\_enable_{n-2} = 1) \\ Sc_n[1] \wedge cext\_err_n & \text{else} \end{cases} \quad (3)$$

$$Sd_n[0] = \begin{cases} Sc_n[0] \wedge TXD_n[0] & \text{if } (tx\_enable_{n-2} = 1) \\ Sc_n[0] \wedge cext_n & \text{else} \end{cases} \quad (4)$$

where "^" denotes the "EXCLUSIVE OR" logic operator; integer "n" is a time index; signal "tx_enable" is a valuable by which (tx_enable$_{n-2}$=1) represents a time period when TXD$_n$[7:0] data is being transmitted; otherwise, it indicates a time period with no TXD$_n$[7:0] data activity. In normal mode during which signal tx_mode=SEND_N, a time period with no TXD$_n$[7:0] data being transmitted is referred to as an inter-frame period, also known as an inter-packet gap. In equations (3) and (4), signal "cext_err$_n$" and signal "cext$_n$" represent the carrier extension error bit and the carrier extension bit respectively, as defined in IEEE Standard 802.3, each of which has two values. Signals "cext_err$_n$" and "cext$_n$" are generated respectively based on certain GMII signaling conditions as defined in IEEE Standard 802.3.

The above is a brief description of 1000Base-T PCS transmit operation, more detailed description can be found in Chapter 40 of IEEE Standard 802.3, "Physical Coding Sublayer (PCS), Physical Medium Attachment (PMA) Sublayer and Baseband Medium, Type 1000BASE-T".

The following observations are made from the equations (1) through (4):

In equation (1), bit $Sd_n[3]$ actually does not carry any additional data information during inter-frame periods;

In equation (2), signal "loc_rcvr_status" is fixed at value "OK" during inter-frame periods in the normal mode. Therefore, bit $Sd_n[2]$ actually does not carry any additional data information during inter-frame periods in normal mode;

In equations (3) and (4), signal "cext_err$_n$" and signal "cext" are ignored or are always de-asserted as logic 0 during inter-frame periods when a 1000Base-T link operates in full-duplex mode. Therefore, bits $Sd_n[1]$ and $Sd_n[0]$ actually do not carry any additional data information during inter-frame periods when a 1000Base-T link operates in full-duplex mode;

On the other hand, according to the Table 40-1 of IEEE Standard 802.3, each quartet of quinary symbols (TA$_n$, TB$_n$, TC$_n$, TD$_n$) is uniquely associated with a 9-bit scrambled data $Sd_n[8:0]$ in which the five most significant bits $Sd_n[8:4]$ are always kept at "00000" during inter-frame periods. Each quartet of quinary symbols (TA$_n$, TB$_n$, TC$_n$, TD$_n$) that appears during inter-frame periods is one of the 16 quartet of quinary symbols listed in Table 40-1 of IEEE Standard 802.3 for signaling idle/carrier extension conditions, which is also used to maintain the synchronization of the scrambling and de-scrambling process of a 1000Base-T Ethernet link.

From the above observations, it can be seen that altering one or more of the four least significant bits $Sd_n[3:0]$ during inter-frame periods while the most significant 5 bits $Sd_n[8:4]$ are kept at "00000" would not generate any non-idle signals to be transmitted during any inter-frame period. Therefore, the synchronization of the scrambling and de-scrambling process of a 1000Base-T Ethernet link is still maintained.

Therefore, according to the present invention, up to 4 bits selected from the scrambled bits $Sd_n[3:0]$ can be used for transferring out-of-band data during the inter-frame periods of an Ethernet channel operating as a 1000Base-T Gigabit Ethernet link while the integrity of the 1000Base-T Ethernet link is fully maintained.

According to the present invention, the following equations (5) through (8) are provided for transferring out-of-band data by using respective bits $Sd_n[3:0]$ during inter-frame periods:

$$Sd_n[3] = \begin{cases} Sc_n[3] \wedge TXD_n[3] & \text{if } (tx\_enable_{n-2} = 1) \\ Sc_n[3] \wedge (!\, OOB\_D_n[3]) & \text{else if } (tx\_mode = SEND\_N) \\ Sc_n[3] & \text{else} \end{cases} \quad (5)$$

$$Sd_n[2] = \begin{cases} Sc_n[2] \wedge TXD_n[2] & \text{if } (tx\_enable_{n-2} = 1) \\ Sc_n[2] \wedge OOB\_D_n[2] & \text{else if } (tx\_mode = SEND\_N) \\ Sc_n[2] \wedge 1 & \text{else if } (loc\_rcvr\_status = OK) \\ Sc_n[2] & \text{else} \end{cases} \quad (6)$$

$$Sd_n[1] = \begin{cases} Sc_n[1] \wedge TXD_n[1] & \text{if } (tx\_enable_{n-2} = 1) \\ Sc_n[1] \wedge (!\, OOB\_D_n[1]) & \text{else if } (tx\_mode = SEND\_N \,\&\, duplex\_mode = FULL) \\ Sc_n[1] \wedge cext\_err_n & \text{else} \end{cases} \quad (7)$$

$$Sd_n[0] = \begin{cases} Sc_n[0] \wedge TXD_n[0] & \text{if } (tx\_enable_{n-2} = 1) \\ Sc_n[0] \wedge (!\, OOB\_D_n[0]) & \text{else if } (tx\_mode = SEND\_N \,\&\, duplex\_mode = FULL) \\ Sc_n[0] \wedge cext_n & \text{else} \end{cases} \quad (8)$$

Where "!" denotes the "NOT" logic operator; "&" denotes the "AND" logic operator. $OOB\_D_n[k]$ (k=0, 1, 2, or 3) represents a 1-bit out-of-band data at time index "n" which is transmitted along with the associated scrambled bit $Sd_n[k]$ (k=0, 1, 2 or 3).

Signal "duplex_mode" in equations (7) and (8) is a signal of two values including "FULL" and "HALF" for indicating full-duplex mode and half-duplex mode of the 1000Base-T Ethernet link, respectively. Typically, this signal value is available from a register bit in the PHY device as the result of auto-negotiation or manual setting.

According to the present invention, each 1-bit out-of-band data $OOB\_D_n[k]$ (k=0, 1, 2, or 3) is an encoded bit stream by an encoding method to ensure that the out-of-band data is properly transmitted and received. In one embodiment of the present invention, a 4B/5B encoding method according to Table 1 is applied to an original 1-bit out-of-band input data to form a corresponding 1-bit encoded data $OOB\_D_n[k]$ (k=0, 1, 2, or 3). The 1-bit out-of-band input data is first converted to 4-bit parallel data, each of which is encoded as one of the sixteen 5-bit Data code-groups (Code-Group 0 through F) of Table 1. A 5-bit IDLE code-group of "11111" is transmitted when no out-of-band data is available for transmission. Another two 5-bit code-groups J and K are always grouped together as a code-group pair "1100010001" and are transmitted regularly for establishing code-group boundaries to facilitate the decoding process at the receiver.

The 4B/5B encoding method represented by Table 1 ensures that there are no more than 3 consecutive zeros in an encoded bit stream of $OOB\_D_n[k]$ (k=0, 1, 2, or 3). As a result, signal "loc_rcvr_status" is also encoded by the 4B/5B encoding method when bit $Sd_n[2]$ is used to transmit out-of-band data. In other words, as long as no more than 3 consecutive 0's in the encoded bit stream of the out-of-band data is detected, signal "rem_rcvr_status" will be decoded as "OK"; otherwise, it will be decoded as "NOT OK".

On the other hand, when there is no more encoded out-of-band data available for transmission, 5-bit IDLE code-groups are transmitted, during which equations (5) through (8) become equivalent to equations (1) through (4) respectively. This indicates that a physical layer device with the least significant bits $Sd_n[3:0]$ being implemented in accordance with equation (5) through (8) will operate compatibly with a standard 1000Base-T physical layer device when out-of-band data is not transmitted.

TABLE 1

4B/5B Code-Groups for Encoding Out-of-Band Data

| Name | Description | 5B Code-Group | 4B Code | Loc_rcvr_status |
|---|---|---|---|---|
| 0 | Data #0 | 11110 | 0000 | OK |
| 1 | Data #1 | 01001 | 0001 | OK |
| 2 | Data #2 | 10100 | 0010 | OK |
| 3 | Data #3 | 10101 | 0011 | OK |
| 4 | Data #4 | 01010 | 0100 | OK |
| 5 | Data #5 | 01011 | 0101 | OK |
| 6 | Data #6 | 01110 | 0110 | OK |
| 7 | Data #7 | 01111 | 0111 | OK |
| 8 | Data #8 | 10010 | 1000 | OK |
| 9 | Data #9 | 10011 | 1001 | OK |
| A | Data #A | 10110 | 1010 | OK |
| B | Data #B | 10111 | 1011 | OK |
| C | Data #C | 11010 | 1100 | OK |
| D | Data #D | 11011 | 1101 | OK |
| E | Data #E | 11100 | 1110 | OK |
| F | Data #F | 11101 | 1111 | OK |
| I | IDLE | 11111 | Undefined | OK |
| J | SSD#1 | 11000 | Undefined | OK |
| K | SSD#2 | 10001 | Undefined | OK |
| V | Invalid | Invalid | Undefined | NOT OK |

It can be appreciated by a person skilled in the art that other mB/nB encoding methods such as 8B/10B may be used for encoding out-of-band data, where m, and n are two positive integers with m<n.

Referring to FIG. 7, it is a block diagram of a modified 1000Base-T PCS transmitter of the present invention for transferring out-of-band data via the scrambled bit $Sd_n[2]$. A functional module 740 includes a serial-to-parallel converter (S/P), a 4B/5B encoder, a parallel-to-serial converter (P/S) and a first-in, first-out (FIFO) memory. The original 1-bit out-of-band data input $OOB\_IN_n$ 675 is converted by the serial-to-parallel converter S/P into a 4-bit parallel data that is applied to the 4B/5B encoder; each 5-bit output data from the 4B/5B encoder is converted by the parallel-to-serial converter P/S to a 1-bit data sequence which is then temporally stored in the FIFO. During inter-frame periods, the 1-bit out-of-band data stored in the FIFO is read out sequentially, represented as $OOB\_D_n$ 685, and is applied to a modified Data Scrambler and Convolution Encoder 720. Modified Data Scrambler and Convolution Encoder 720 also receives GMII input data $TXD_n[7:0]$ 605, $SC_n[7:0]$ 615, signal "loc_rcvr_status" 655, signal "tx_mode" 665 and any other relevant GMII signals and operates in accordance with equation (6) to generate the scrambled bit $Sd_n[2]$, which carries the associated out-of-band data bit $OOB\_IN_n$ 675, while the other 8 bits of $Sd_n[8:0]$ are generated as originally defined by IEEE Standard 802.3.

Similarly, FIG. 7 can be adapted for transferring out-of-band data via bit $Sd_n[3]$, $Sd_n[1]$ or $Sd_n[0]$ in which modified Data Scrambler and Convolution Encoder 720 operates in accordance with equation (5), (7) or (8) to generate bit $Sd_n[3]$, $Sd_n[1]$ or $Sd_n[0]$, while all the other 8 bits of $Sd_n[8:0]$ are generated as originally defined by IEEE Standard 802.3. In such cases, signal "loc_rcvr_status" 655 is not used. Obviously, when the scrambled bit $Sd_n[1]$ or $Sd_n[0]$ is used for transferring out-of-band data, signal "duplex_mode" 695 shall be made available to Modified Data Scrambler and Convolution Encoder 720 for generating bit $Sd_n[1]$ or $Sd_n[0]$.

Furthermore, more than one bits selected from the four scrambled bits $Sd_n[3:0]$ can be used for transferring out-of-band data at higher data rates as will be illustrated below.

Referring to FIG. 8, it is a block diagram of an embodiment of the present invention for transferring out-of-band data by using all of the four scrambled bits $Sd_n[3:0]$ where the out-of-band data is 4-bit data that is operated according to the Media Independent Interface signaling protocol as defined in IEEE 802.3. Under the control of a memory control circuit 830, 4-bit MII data $MII\_D_n[3:0]$ 815, is first written into a first FIFO memory 810, which is a memory device with a 4-bit data input port and a 16-bit data output port; the 16-bit output data from first FIFO 810 is organized as four 4-bit data 825; each 4-bit data 825 is encoded by a corresponding 4B/5B encoder 840 into 5-bit data 835 which is then converted by a corresponding parallel-to-serial converter 850 into a sequence of 1-bit data 845; the four 1-bit data 845 are grouped as 4-bit data and is written into a second FIFO memory 820 with a 4-bit data input port and a 4-bit data output port. Each 4-bit output data $OOB\_D_n[3:0]$ 855 from second FIFO memory 820 is sent to Modified Data Scrambler and Convolution Encoder 720 as depicted in FIG. 7, which operates according to equations (5) through (8) to generate bits $Sd_n[3:0]$. Although it is not explicitly shown in FIG. 8, it should be noted that each parallel-to-serial converter 850 and second FIFO memory 820 operate synchronously under the 125 MHz transmit clock of the associated 1000Base-T PCS transmitter; and first FIFO memory 810 operates at a 25 Mhz clock which is synchronous to the 125 Mhz transmit clock. Memory control circuit 830 coordinates the read and write operation of first FIFO memory 810 via status and control lines 865 and the read and write operation of second FIFO memory 820 via status and control lines 875. In this embodiment of the present invention, memory control circuit 830 also generates various control and status signals of the Media Independent Interface signaling which include a Carrier Sense signal $CRS_n$ 885. Signal $CRS_n$ 885 is generated and used as a status signal for signaling the memory space availability of first FIFO memory 810 for the purpose of receiving new data. When first FIFO memory 810 is full, signal $CRS_n$ 885 is asserted to indicate that first FIFO memory 810 is not available for receiving new data; when first FIFO memory 810 is not full, signal $CRS_n$ 885 is de-asserted. In such a way, an Ethernet MAC device can transfer its data seamlessly as out-of-band data via its Media Independent Interface over a 1000Base-T Gigabit Ethernet link. As can be appreciated by a person skilled in the art, such an Ethernet MAC device should be configured to operate in half duplex mode for signal $CRS_n$ 885 to take effect because signal $CRS_n$ 885 is usually ignored when a MAC device operates in full duplex mode.

Although FIG. 7 and FIG. 8 depict primarily the transmit operation of the modified 1000Base-T PCS transmitter for establishing an out-of-band channel over of a 1000Base-T link, it should be appreciated by a person skilled in the art that the receiving end performs the reversed operation to the PCS transmit operation.

The maximum data rate available for an out-of-band channel established by using a single scrambled bit selected from bits $Sd_n[3:0]$ is simply the symbol rate of 1000Base-T Ethernet, which is 125 Mbps according to IEEE Standard 802.3, weighted by the coding efficiency of the encoding method employed. As an example, for a 4B/5B encoded bit stream of out-of-band data, which has a coding efficiency of 4/5 or 0.8, the maximum data rate is 125 Mb/s×4/5=100 Mb/s.

The minimum data rate of the out-of-band channel by using a single scrambled bit selected from bits $Sd_n[3:0]$ occurs when Ethernet packets of the associated 1000Base-T Ethernet channel are being transmitted continuously with maximum packet length and the minimum inter-frame periods. According to IEEE Standard 802.3, the minimum inter-frame period is of 12 bytes, and maximum packet length is 1530 bytes that include 7 bytes of preambles, 1 byte of SSD (Start of Stream Delimiter) and 4 bytes of VLAN header. Therefore, the minimum packet rate is calculated as:

Packet Rate (min)=1,000,000,000/((1530+12)×8)= 81064 (packets/second)

Thus, the minimum date rate is:

Date Rate (min)=81064×12×4/5=778 (Kbps)

Again, the above minimum data rate is calculated under the assumption that the out-of-band data is 4B/5B encoded with a coding efficiency of 4/5, or 0.8.

As can be appreciated by a person skilled in the art, when four scrambled bits $Sd_n[3:0]$ are used for transferring out-of-band data, a date rate up to 400 Mbps can be achieved for transferring out-of-band data along with the associated 1000Base-T Gigabit Ethernet link.

As can be further appreciated by a person skilled in the art, even the minimum data rate available to the out-of-band channel established over a 1000Base-T Gigabit Ethernet link according to the present invention provides adequate bandwidth for transmission of at least one packetized IP telephony signal, which usually requires a transmission date rate of less than 100 Kbps.

Figure 9:
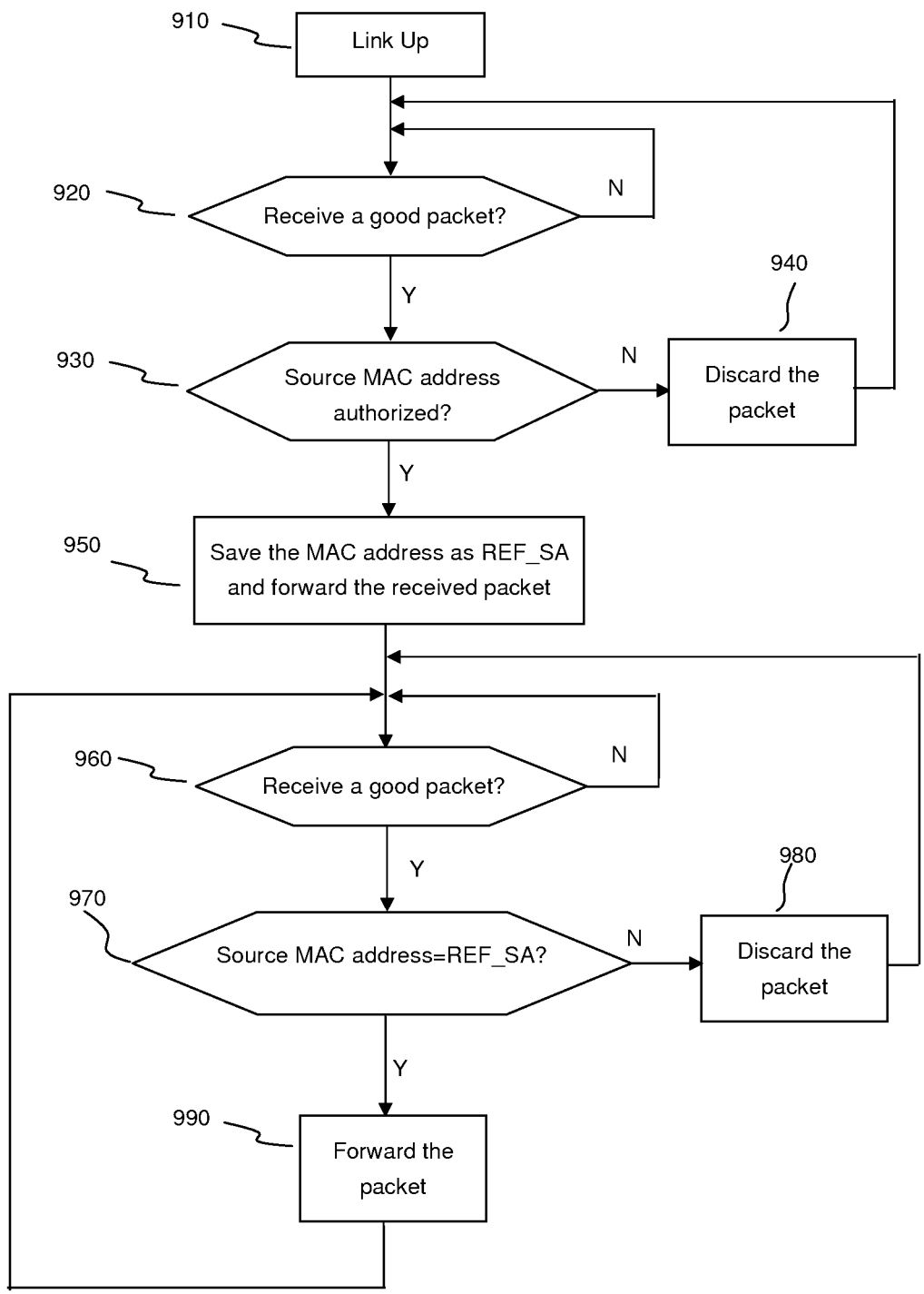
FIG. 9 is a flow diagram for controlling access of a voice terminal such as an IP phone to voice switch 130.

Referring to FIG. 9, it is a flow diagram for illustrating a process that can be implemented for network access control and for tracking locations of IP phones 160 according to the present invention. The process is described as follows with reference to a selected I/O port of voice switch 130:

Step 910: Go to Step 920 when an out-of-band channel is activated between the I/O port of voice switch 130 and a corresponding IP phone 160; otherwise, stay at Step 910.

Step 920: The I/O port of voice switch 130 waits for receiving the first good packet from IP phone 160. A good received packet refers to a received Ethernet packet without any bit errors transmitted from IP phone 160; if a good received packet is received, go to Step 930; otherwise, stay at Step 920.

Step 930: Check the source MAC address of the first received good packet to see if or not it is an authorized MAC address. The inspection of the source MAC address of the received packet is done by comparing it with a database of authorized source MAC addresses, each of which is assigned to an authorized IP phone as a physical identification for uniquely identifying the IP phone. This MAC address database can be stored locally in voice switch 130, or it can be located in a server that is accessed by voice switch 130 remotely. If the source MAC address of the first received good packet from IP phone 160 is an authorized MAC address, go to Step 950; otherwise go to Step 940.

Step 940: Drop the received packet; then go back to Step 920.

Step 950: Forward the received packet to one or multiple network I/O ports accordingly by voice switch 130 based on the destination MAC address of the received packet; and the source MAC address of the received packet is stored as a reference MAC address (REF_SA) associated with the I/O port; then go to Step 960.

Step 960: Wait for receiving a new good packet. If a new good packet is received, go to Step 970; otherwise, stay at Step 960.

Step 970: Check if or not the newly received good packet following the first received good packet is from the same authorized IP phone 160 that sent the first good packet. This is done by comparing the source MAC address of the newly received packet with the stored reference MAC address REF_MAC. If it is, go to Step 990; otherwise, go to Step 980;

Step 980: Drop the received good packet; go to Step 960.

Step 990: Forward the newly received good packet accordingly based on the destination MAC address of the received packet and then go to Step 960.

As such, the I/O port of voice switch 130 receives and forwards packets from only one authorized IP phone 160, and therefore the port number of the I/O port of voice switch 130 is uniquely associated with the MAC address of one single authorized IP phone 160. This feature can be utilized in tracking the location of the IP phone 160.

Another embodiment of the present invention for device access control implements a MAC address-based Dynamic Host Configuration Protocol (DHCP) server. A DHCP server is usually used to assign an IP address to a terminal device that is newly connected to a network, which simplifies network administration because the assignment and management of IP addresses are done automatically by software. According to this embodiment of the present invention, the MAC address-based DHCH server is linked to voice switch 130 and maintains a database of MAC addresses of all the authorized IP phones 160; when IP phone 160 is initially connected to voice switch 130, it sends a packet for requesting an IP address to the MAC address-based DHCP server; the MAC address-based DHCP server receives the IP address request packet and assigns an IP address from its authorized MAC address database to the newly connected IP phone by replying a packet with assigned IP address only if the source MAC address of the newly connected IP phone is found to be an authorized MAC address. In such a way, any unauthorized terminal device would not be able to be assigned an IP address to start communicating its packets with voice switch 130. Such an embodiment of the present invention is applicable when an IP phone or a terminal device is configured to receive an IP address from a DHCP server, and it is not applicable to a device whose IP address is manually and statically assigned. However, such an embodiment of the present invention provides a simple and effective solution to prevent an unauthorized device such as computer 150 from mistakenly connecting to voice switch 130.

Although the present invention has been disclosed in terms of the foregoing embodiments, it is to be understood that such disclosure is not to be interpreted as limiting. Various alternations and modifications will no doubt become apparent to those skilled in the art after reading the above disclosure.

Furthermore, although the present invention has been described in terms of its application to IP telephony communications over a local area network, it should be noted that the scope of present invention is not limited to this specific application. For example, in a two-switch based local area network of the present invention, the second switch operating over the out-of-band channels on shared network cabling can be used for implementing a control plane for the first switch.

Accordingly, it is intended that the appended claims be interpreted as covering all alternations and modifications as fall within the true spirit and scope of the invention.

I claim:

1. A network apparatus for transferring out-of-band data with Gigabit Ethernet data over an established communication link, comprising:
a multiplexing circuit, the multiplexing circuit having a first arrangement for receiving the out-of-band data;
a second arrangement for receiving the Gigabit Ethernet data, the out-of-band data and the Gigabit Ethernet data being applied externally to the network apparatus; and
a data scrambler, the data scrambler scrambling the Gigabit Ethernet data during a data transmission period of the established communication link, the data scrambler being configured to generate a sequence of scrambled data values during an inter-frame period of the established communication link, each scrambled data value in the sequence of scrambled data being mapped to an idle symbol selected from a plurality of idle symbols based on the out-of-band data and based on status/control signals internally generated within the network apparatus, wherein the out-of-band data is transferred during the inter-frame period of the established communication link without generating any non-idle signals.

2. The network apparatus of claim 1, further comprising: a memory buffer and a memory controller, wherein the out-of-band data is stored sequentially into the memory buffer, the memory buffer being under control of the memory controller, the memory controller being configured to generate a carrier sense signal based on memory space availability within the memory buffer.

3. The network apparatus of claim 1, wherein the established communication link is a 1000Base-T Ethernet link when no out-of-band data is available for transmission.

4. The network apparatus of claim 3, wherein a maximum data rate for the out-of-band data is at least 100 Mbps at a coding efficiency of 0.8.

5. The network apparatus of claim 1, further comprising:
a 4B/5B encoder that receives the out-of-band data from the first arrangement and encodes the out-of-band data, wherein a five-bit IDLE code-group is transmitted when no out-of-band data is available for transmission.

6. The 4B/5B encoder of claim 5, wherein the 4B/5B encoder encodes the status/control signals.

7. The network apparatus of claim 6, wherein at least one invalid five-bit code-group is selected to represent a faulty status of the network apparatus.

8. The network apparatus of claim 1, wherein each scrambled data value consists of nine bits and wherein at least one bit selected from four least significant bits of each scrambled data value is configured to transfer the out-of-band data during the inter-frame period.

9. A method of transferring out-of-band data with Gigabit Ethernet data over an established communication link, the method comprising:
receiving the out-of-band data by a network apparatus;
receiving the Gigabit Ethernet data by the network apparatus; and
scrambling the Gigabit Ethernet data by a data scrambler within the network apparatus during a data transmission period of the established communication link, the data scrambler being configured to generate a sequence of scrambled data values during an inter-frame period of the established communication link, each scrambled data value in the sequence of scrambled data values being mapped to an idle symbol selected from a plurality of idle symbols based on the out-of-band data and based on status/control signals internally generated within the network apparatus, wherein the out-of-band data is transferred during the inter-frame period of the established communication link without generating any non-idle signals.

10. The method of claim 9, further comprising:
sequentially storing the out-of-band data in a memory buffer under the control of a memory controller, the memory controller being configured to generate a carrier sense signal based on memory space availability within the memory buffer.

11. The method of claim 9, further comprising,
encoding the out-of-band data by a 4B/5B encoder, wherein a five-bit idle code-group is transmitted when no out-of-band data is available for transmission.

12. The method of claim 11, further comprising:
encoding the status/control signals by the 4B/5B encoder.

13. The method of claim 12, wherein at least one invalid five-bit code-group is selected to represent a faulty status of the network apparatus.

14. The method of claim 9, wherein each scrambled data value consists of nine bits and wherein at least one bit selected from four least significant bits of each scrambled data value is configured to transfer the out-of-band data during the inter-frame period.

15. The method of claim 9, wherein the established communication link is a 1000Base-T Ethernet link when no out-of-band data is available for transmission.

16. The method of claim 15, wherein a maximum data rate for the out-of-band data is at least 100 Mbps at a coding efficiency of 0.8.

* * * * *